April 10, 1934.  C. BARBIERI  1,953,917
ROTARY CUP MACHINE
Original Filed May 25, 1928   12 Sheets-Sheet 2
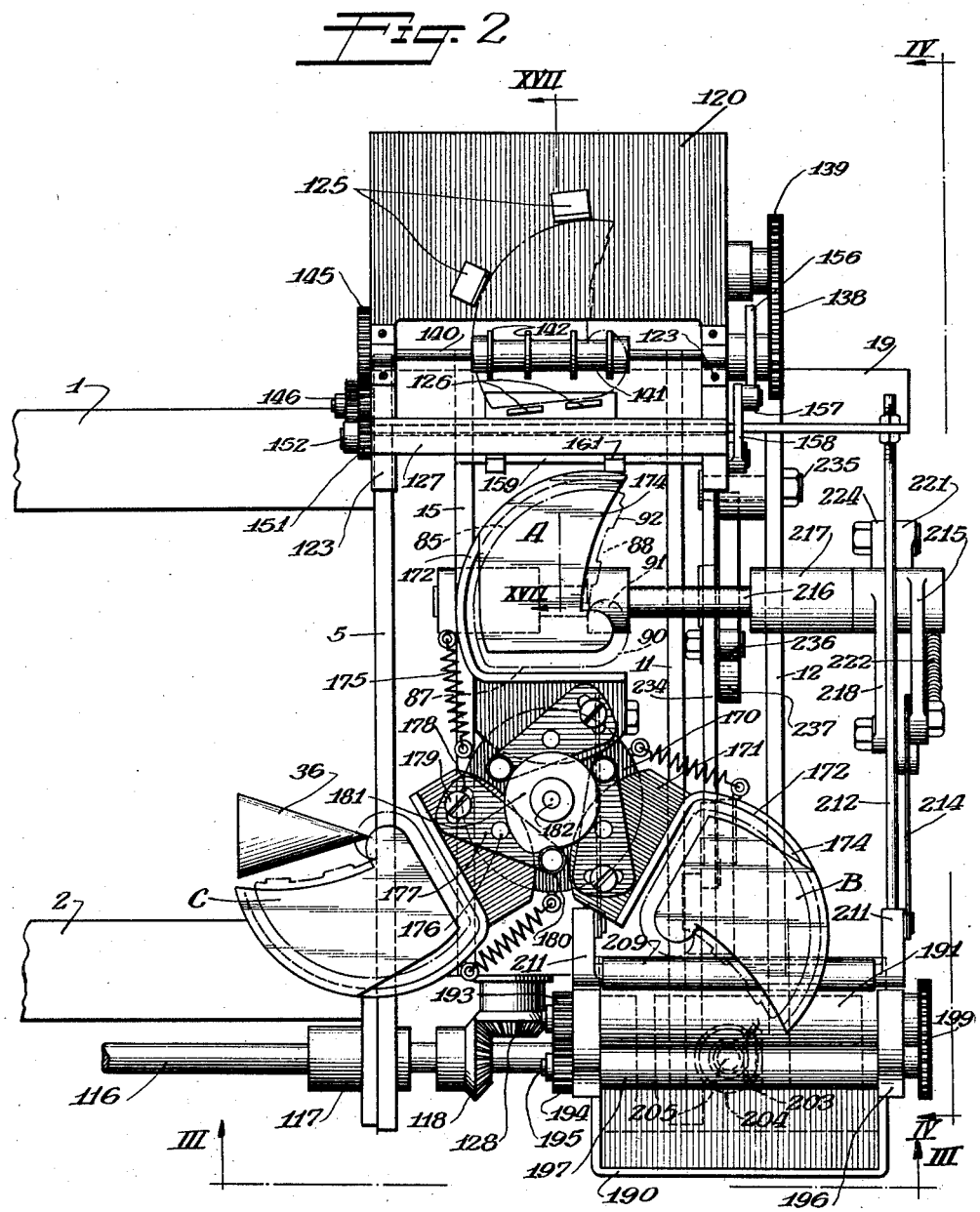

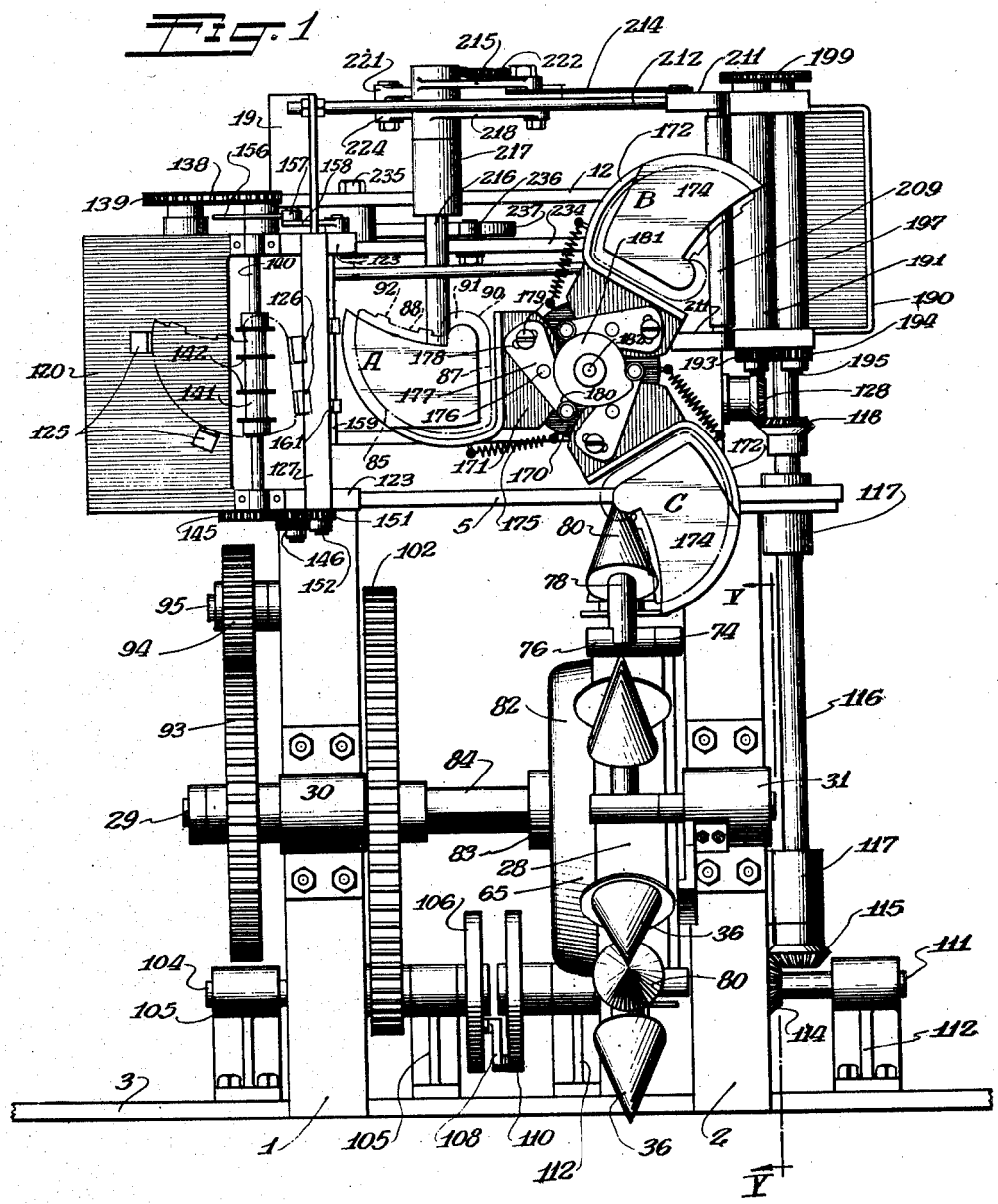

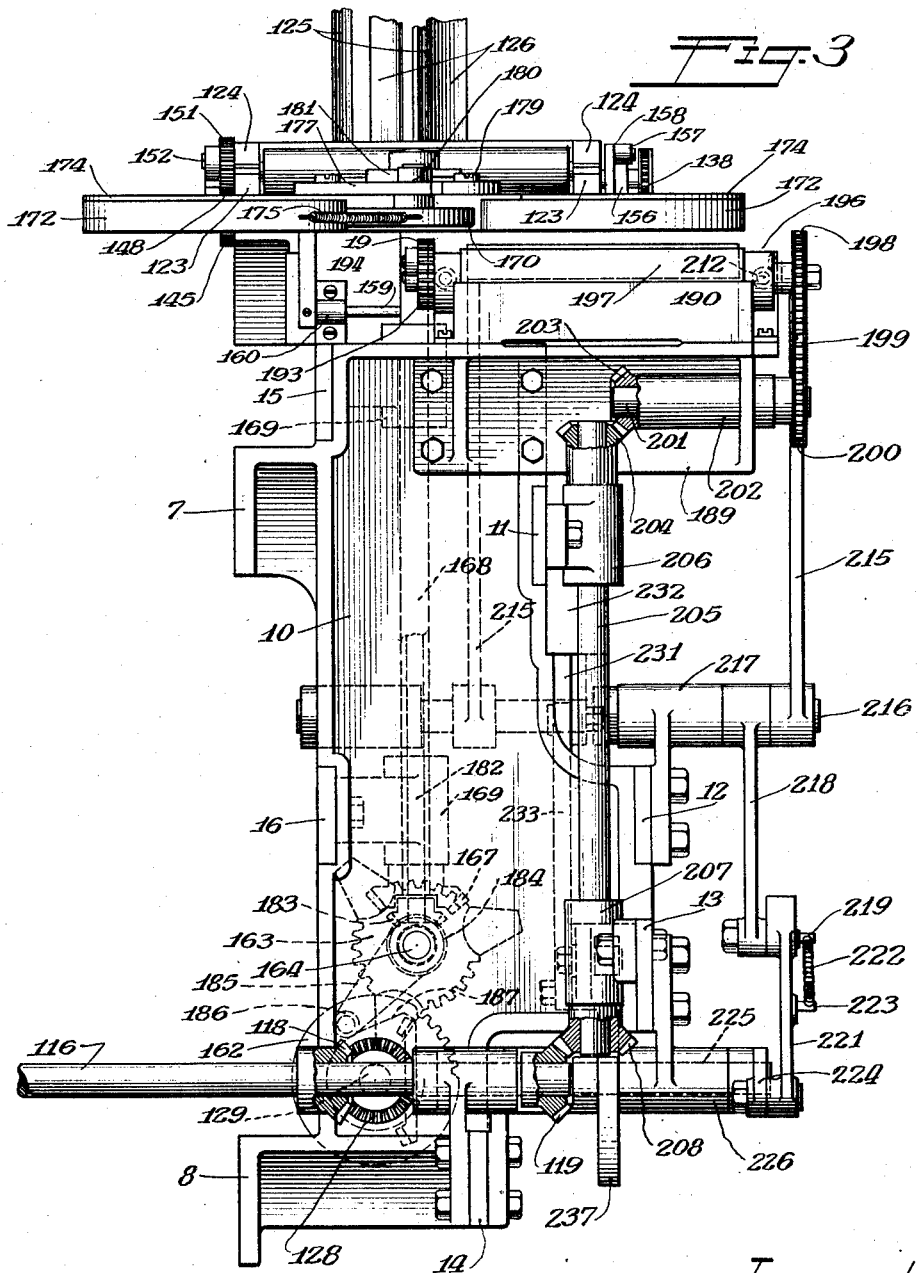

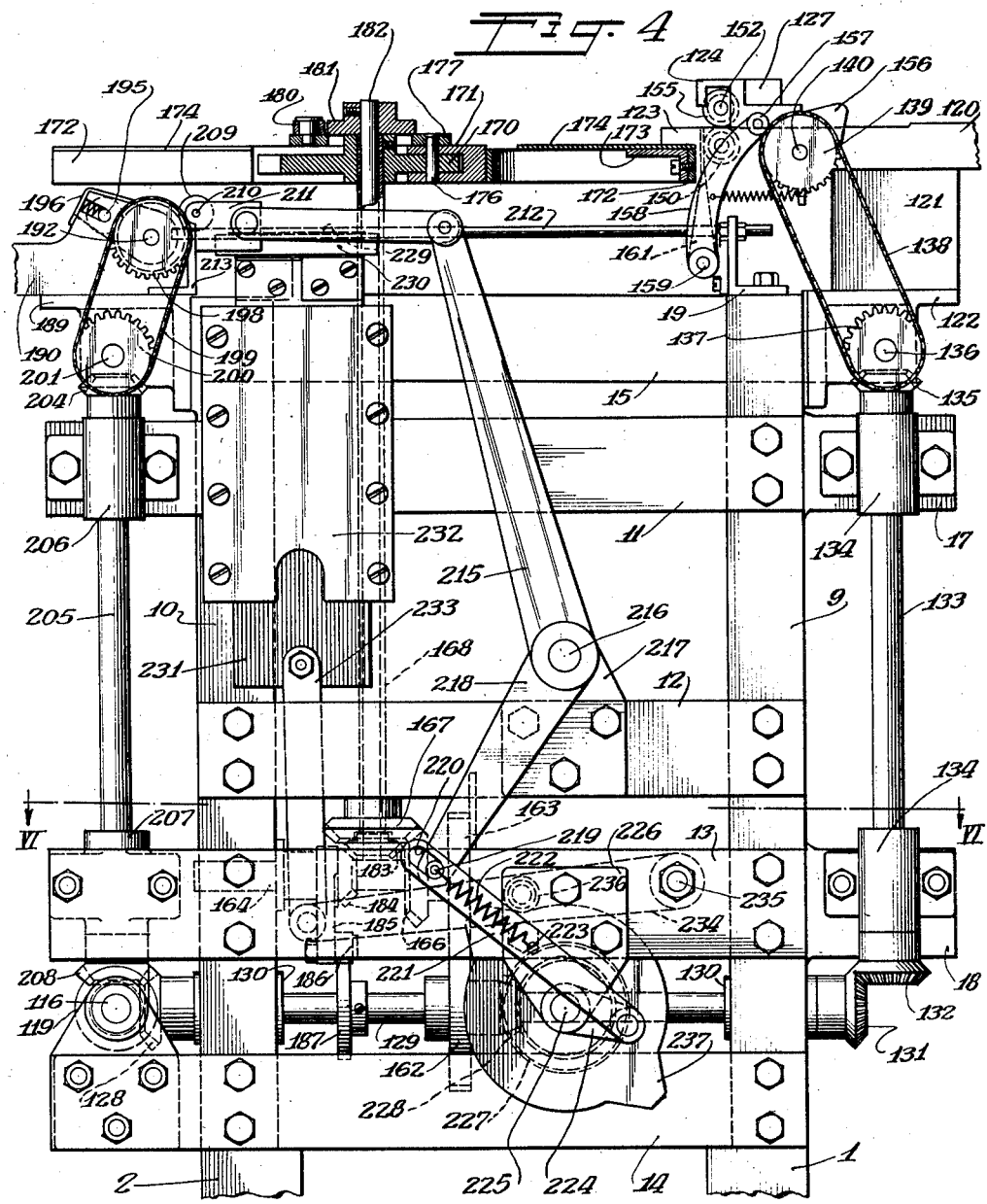

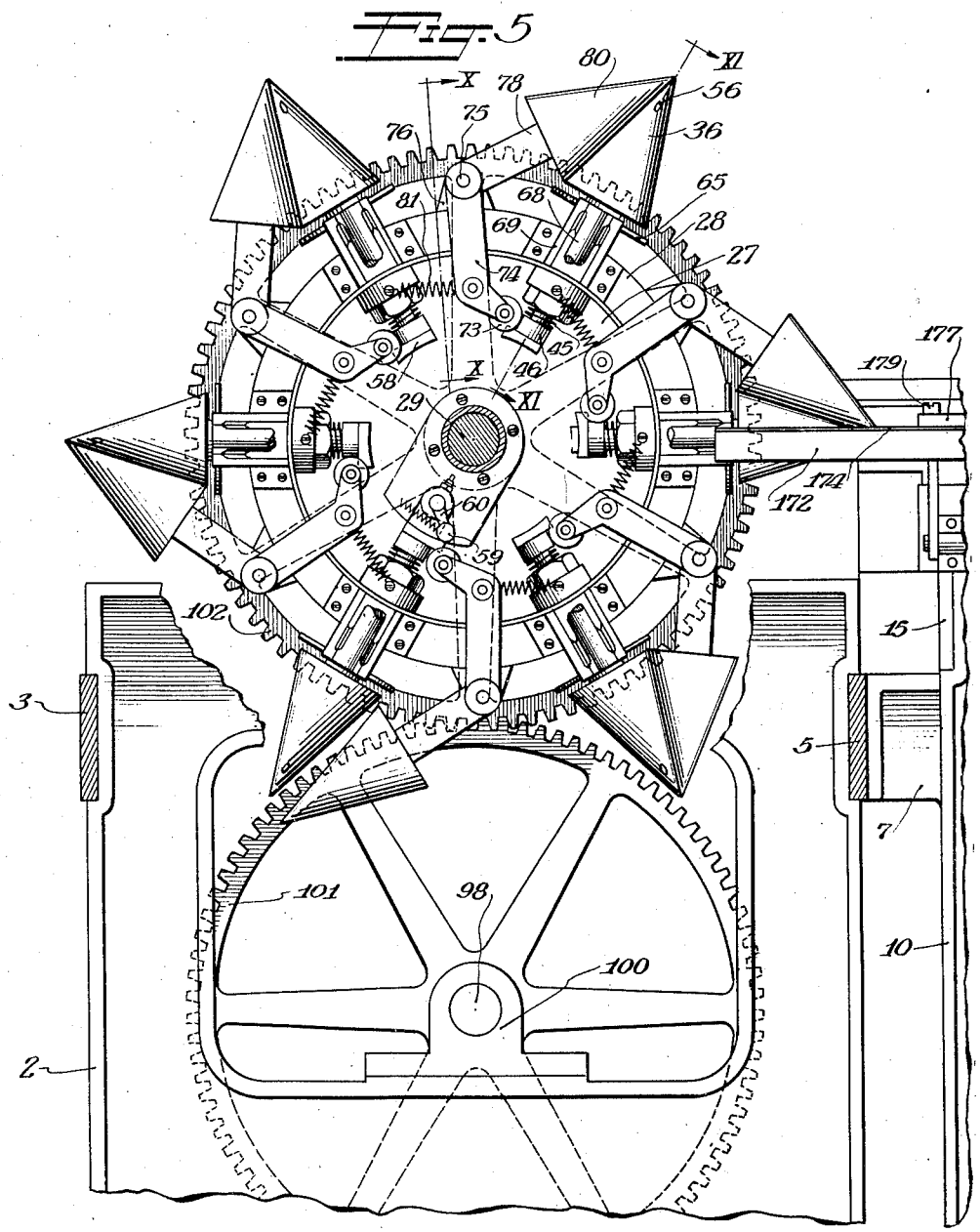

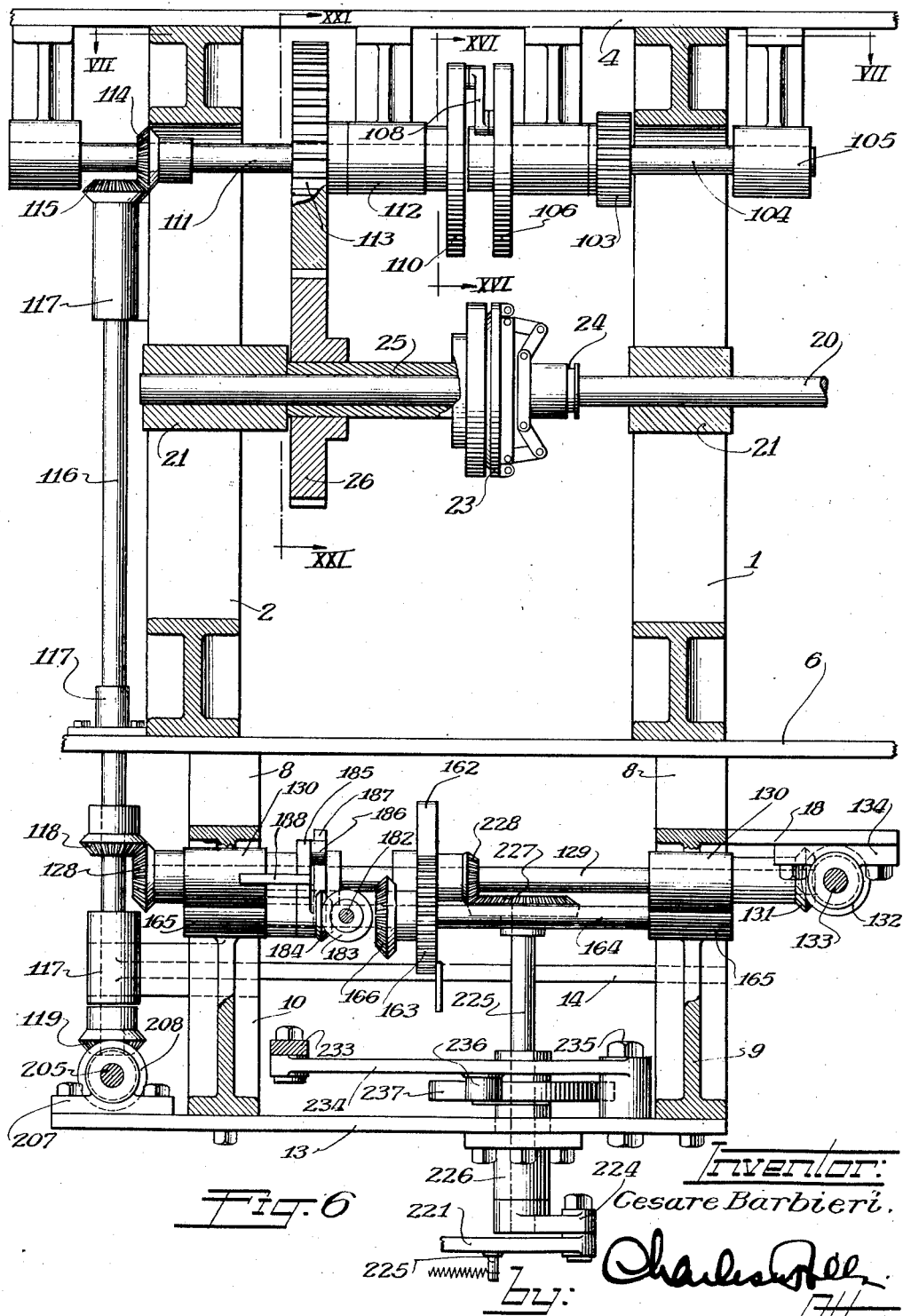

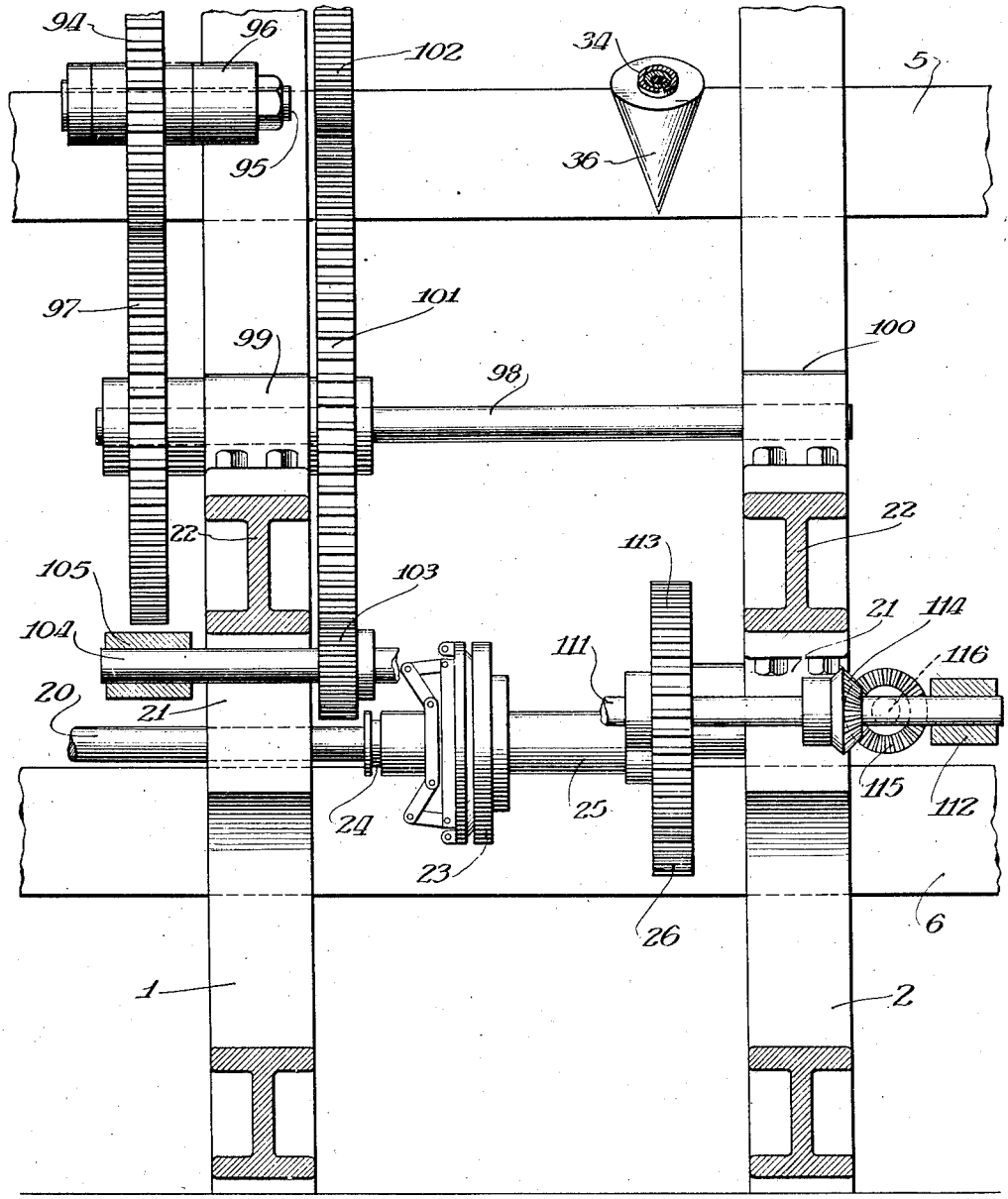

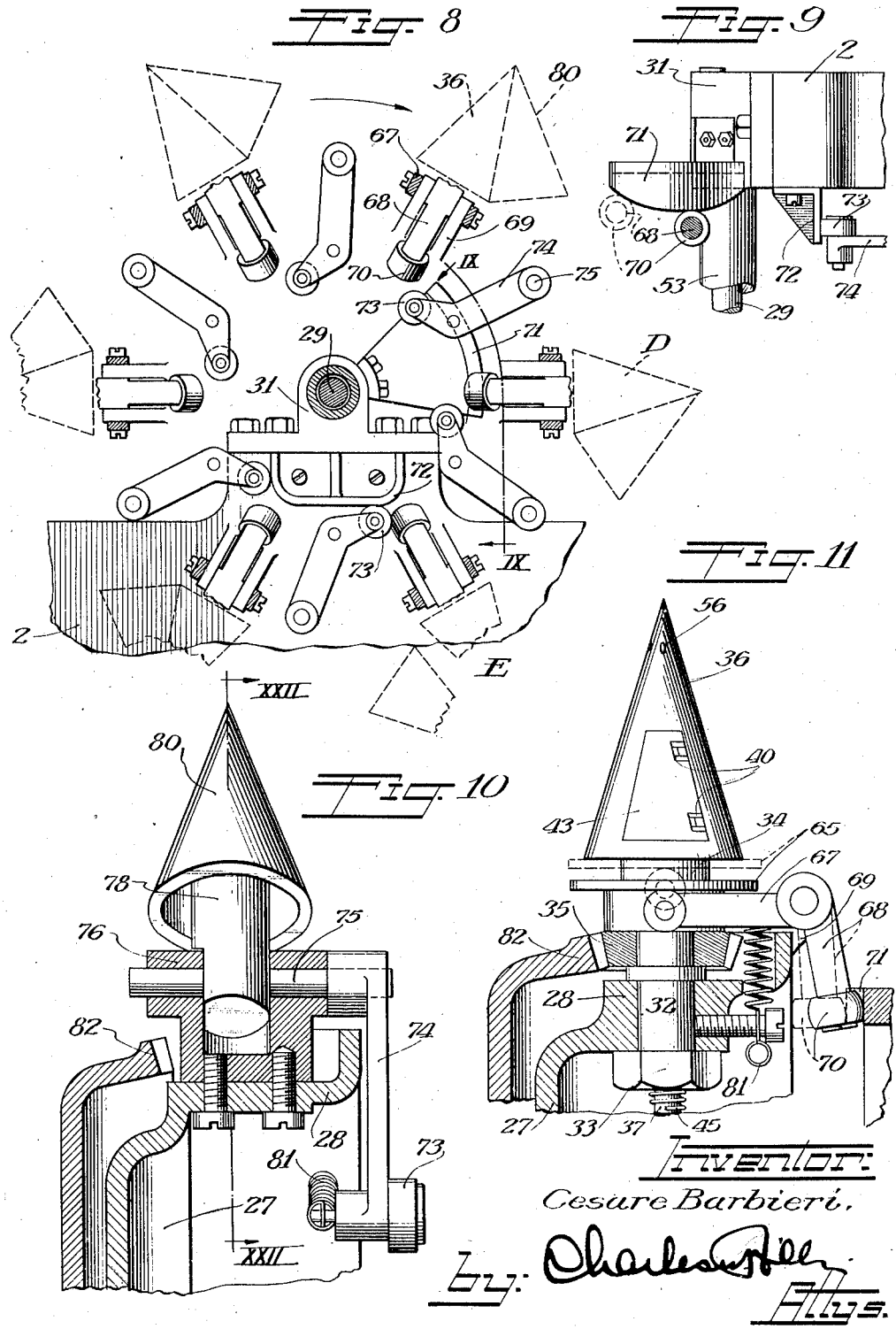

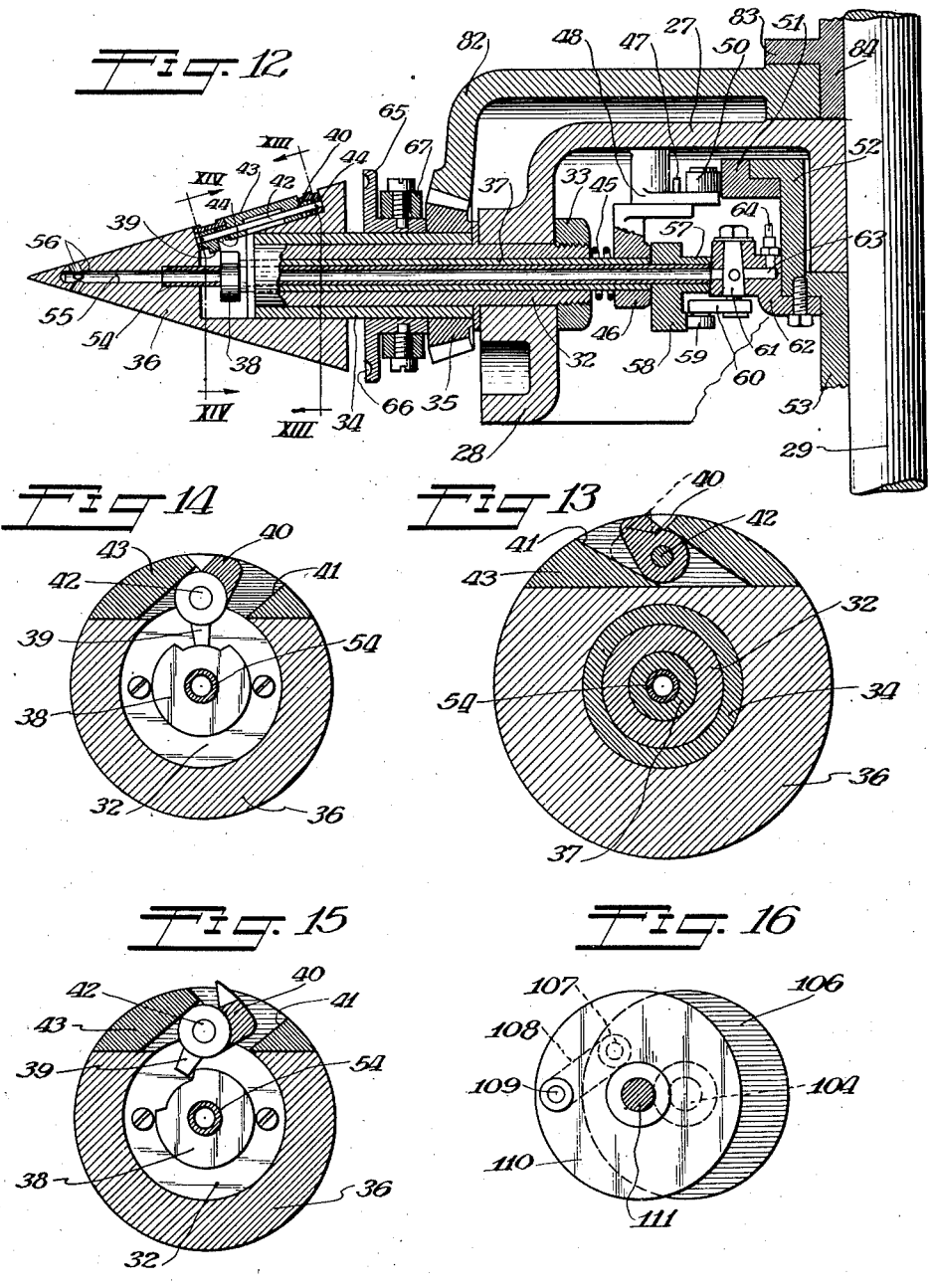

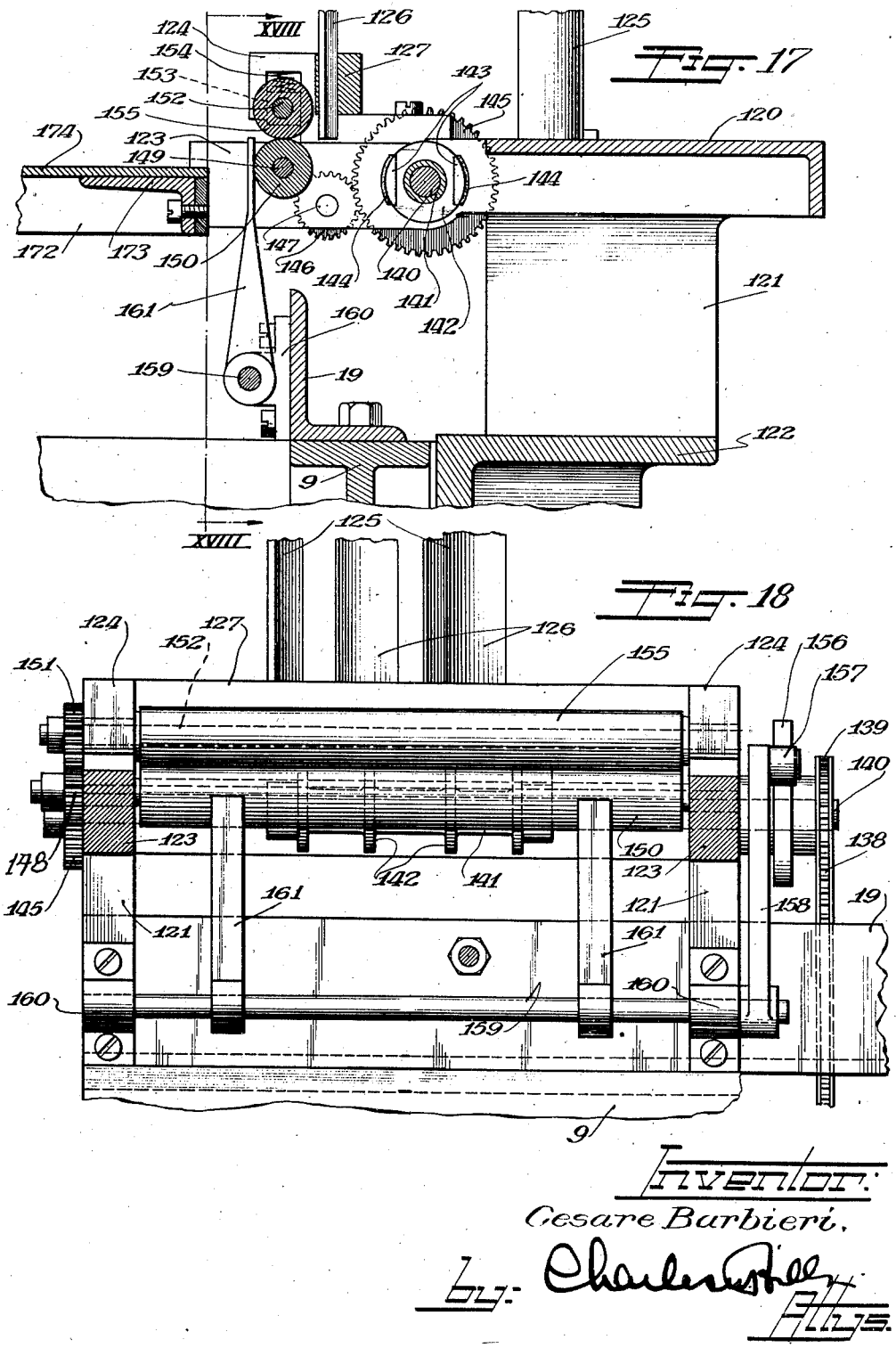

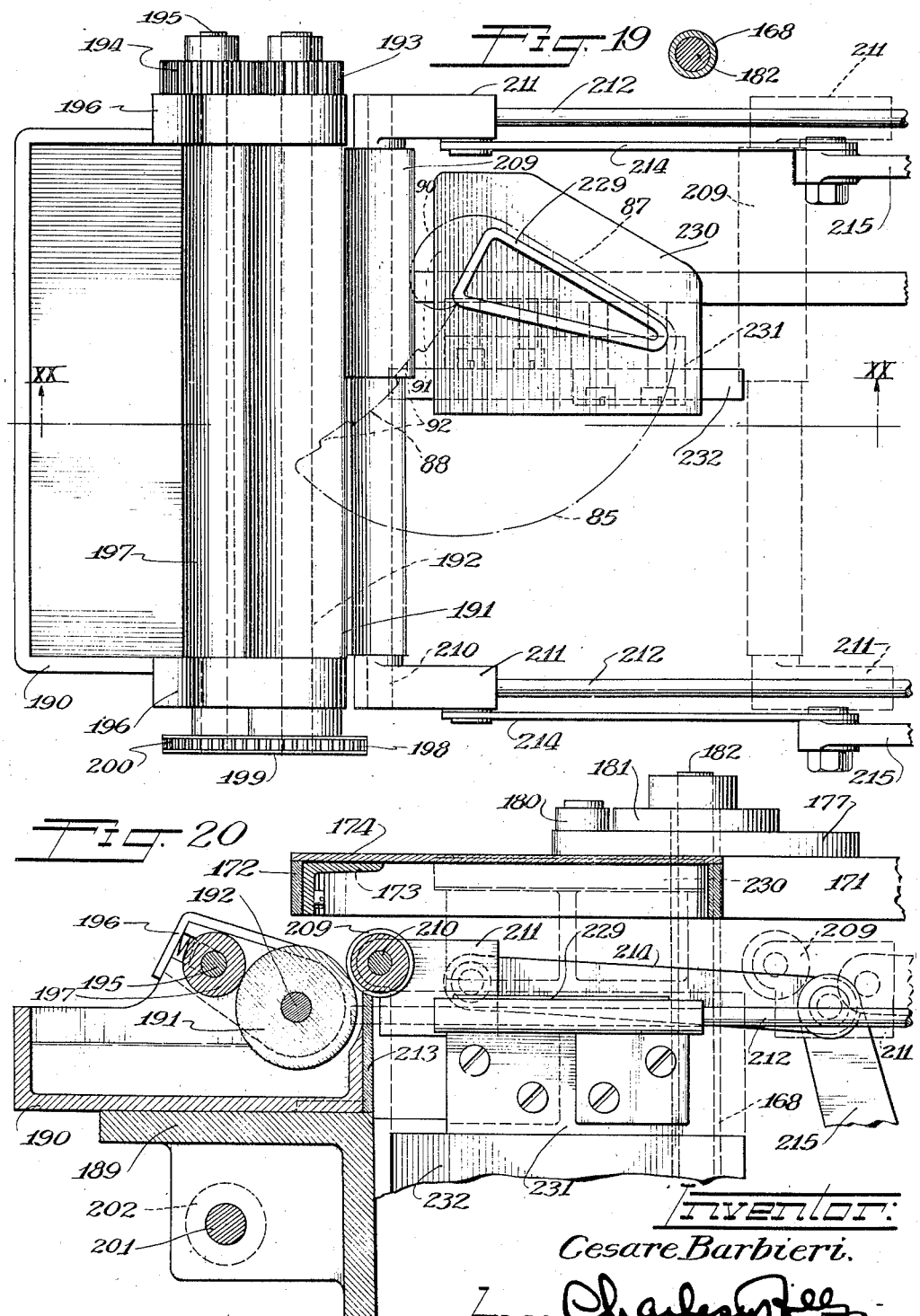

April 10, 1934.  C. BARBIERI  1,953,917
ROTARY CUP MACHINE
Original Filed May 25, 1928    12 Sheets-Sheet 12

Inventor:
Cesare Barbieri.
by Charles Mills
Attys.

Patented Apr. 10, 1934

1,953,917

UNITED STATES PATENT OFFICE 1,953,917

ROTARY CUP MACHINE

Cesare Barbieri, New York, N. Y., assignor, by mesne assignments, to Vortex Cup Company, Chicago, Ill., a corporation of Delaware Application May 25, 1928, Serial No. 280,425
Renewed May 28, 1932

52 Claims. (Cl. 93—36)

This invention relates to a rotary cone cup machine, and more particularly, to an improved machine for automatically producing conical paper cups from glued blanks fed through the machine by improved feeding mechanisms into the field of operation of rotatable and translatable formers to be formed into cups.

It is an object of this invention to provide a rotary type of conical cup making machine having a rotary type of blank transfer feed mechanism for transferring cup blanks from a magazine to a gluing mechanism and then to rotary formers or mandrels on which the blanks are adapted to be rolled and properly formed.

It is also an object of the present invention to provide a machine adapted to automatically feed cup blanks from a magazine onto a rotatable transfer wheel which is operated intermittently to transfer the blank from a blank receiving position into a glue applying position and then into a delivery position wherein the glued blank is adapted to be fed into engagement with grippers contained within a rotatable radially positioned mandrel carried on a rotatable wheel to permit the blank to be formed into a conical cup which is eventually blown off of the mandrel when said mandrel reaches a predetermined position in the rotation of the wheel.

It is a further object of this invention to provide a machine wherein a rotatable spider carries a plurality of rotatable mandrels and presser rolls with each of said mandrels adapted when in an initial position to have a blank fed thereto and then consecutively carried thereby to other positions permitting the blank to be curled around the mandrel and properly pressed to produce a liquid tight conical cup which in the final position of the former is automatically loosened and then blown from the mandrel.

It is also an object of this invention to provide a machine having means for applying glue to a blank carried on a horizontally rotatable transfer table during a period of rest of said table after which the adhesived blank is advanced into a position to permit tabs on said blank to be gripped by cam controlled grippers contained within a forming mandrel rotatably supported on a vertical rotatable forming wheel adapted to rotate to carry the blank gripping mandrel through different stations to permit the blank to be formed into a conical cup and have the outer margin thereof curled to form a drinking rim or bead after which the completed cup is released by the grippers, loosened and then discharged from the mandrel.

It is an important object of this invention to provide a paper cup making machine of the rotary type having a horizontally rotatable transfer mechanism for transferring cup blanks from a magazine to a gluing device and then to a rotatable forming mechanism adapted to carry the blanks to different stations to permit said blanks to be formed into conical cups and pressed as the upper margins of the cups are curled to complete the forming of the cups which are then automatically loosened and discharged from the forming mechanism.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of an improved rotary conical cup making machine embodying the principles of this invention.

Figure 2 is an enlarged fragmentary top plan view of the blank feeding and gluing mechanisms.

Figure 3 is a fragmentary view of the gluing mechanisms taken on line III—III of Figure 2.

Figure 4 is a vertical side view of the blank feeding and gluing mechanisms taken on line IV—IV of Figure 2.

Figure 5 is a fragmentary detail view of the cup forming mechanisms taken on line V—V of Figure 1 with parts omitted.

Figure 6 is a sectional plan view of the lower portion of the machine taken on line VI—VI of Figure 4.

Figure 7 is a fragmentary vertical detail section with parts omitted taken on line VII—VII of Figure 6.

Figure 8 is a schematic view of the cup forming mechanisms with parts omitted and illustrating the control cams governing the forming mandrel, cup rim formers and the movement of the presser rolls.

Figure 9 is a fragmentary detail view taken on line IX—IX of Figure 8 illustrating the control cam for curling the cup rims.

Figure 10 is a fragmentary detail sectional view taken on line X—X of Figure 5, illustrating one of the presser rolls.

Figure 11 is a fragmentary detail section of a forming mandrel taken on line XI—XI of Figure 5, with parts in elevation.

Figure 12 is an enlarged longitudinal detail section of one of the cup forming mandrels.

Figure 13 is an enlarged transverse section of a forming mandrel taken on line XIII—XIII of Figure 12.

Figure 14 is an enlarged transverse detail section of a forming mandrel taken on line XIV—XIV of Figure 12, showing the blank grippers in closed position.

Figure 15 is a similar section showing the blank grippers tripped into open position.

Figure 16 is a detail sectional view of the eccentric control taken on line XVI—XVI of Figure 6.

Figure 17 is an enlarged vertical detail section of the cup body blank feeding mechanisms taken on line XVII—XVII of Figure 2.

Figure 18 is a transverse detail view of the cup blank feeding mechanisms taken on line XVIII—XVIII of Figure 17.

Figure 19 is an enlarged top plan view of the cup blank gluing mechanisms illustrating a cup blank in dotted lines.

Figure 20 is a vertical detail section of the gluing mechanisms taken on line XX—XX of Figure 19.

As shown on the drawings:

Figure 21:
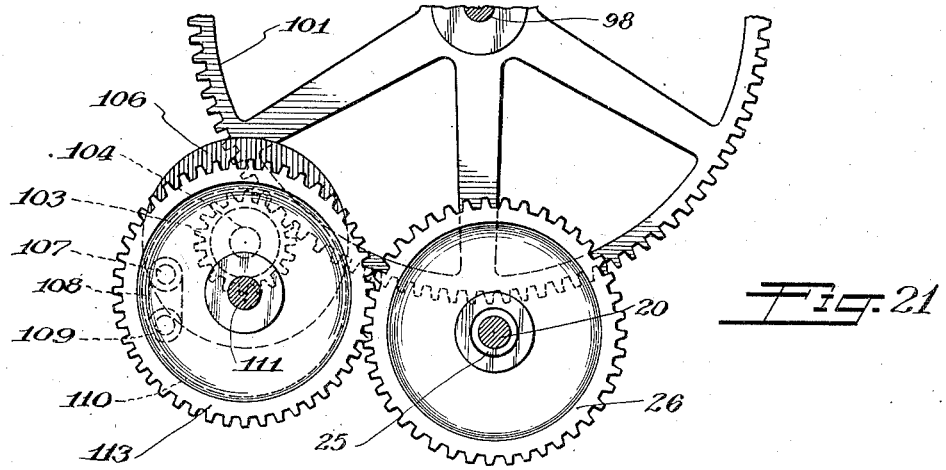
Figure 21 is a fragmentary detail section taken on line XXI—XXI of Figure 6.

The improved rotary conical cup making machine embodying the present invention embraces a plurality of mechanisms adapted to feed a sector-shaped cup blank from a magazine onto a rotatable transfer wheel to be intermittently carried thereby through the field of operation of an adhesive applying device to have adhesive applied to the blank without removal thereof from the transfer wheel; said transfer wheel is then adapted to deliver the tabs of an adhesived cup blank into engagement with the grippers of a forming mandrel to be gripped thereby to cause the blank to be drawn from the transfer wheel and shaped around the mandrel; to carry the partly formed cup blank into another position to cause the blank to be curled around the mandrel to permit the adhesived portion of the blank to be properly pressed against the body of the cup to substantially complete the same; to cause the upper margin of the partly formed cup to be curled downwardly and outwardly to form a rounded drinking rim on the cup; and then to effect the further conveyance of the finished cup into a final position wherein cam controlled means are operated to automatically cause release of the grippers as a cam controlled air valve mechanism is opened to cause the released cup to be blown from the mandrel.

With the above briefly mentioned operations in mind the improved conical cup making machine consists largely of a plurality of associated devices which are supported upon a metal framework comprising a pair of spaced main metal frames 1 and 2, connected at their outer vertical edges by upper and lower crossbeams or bars 3 and 4, respectively. The inner vertical edges of the main frames 1 and 2 are connected by upper and lower transverse beams 5 and 6, respectively. Rigidly secured to the beams 5 and 6 are the upper and lower bracket arms 7 and 8, respectively, which are integrally formed on the inner vertical edges of a pair of auxiliary metal frames 9 and 10, positioned in the planes of the main frames 1 and 2, respectively. Securely fastened to the outer edges of the two auxiliary frames 9 and 10 are a plurality of parallel crossbeams or bars 11, 12, 13 and 14 (Figure 4). The inner edges of the two auxiliary frames 9 and 10 are connected by transverse beams or bars 15 and 16. Integrally formed or rigidly secured to the outer sides of the auxiliary frame 9 are upper and lower brackets 17 and 18, respectively. Secured upon the top of the auxiliary frame 9 is an angle bar 19.

It will be conducive to a clear understanding of the operation of the machine to describe at this point the character and arrangement of the main driving mechanism. A horizontal main driving shaft 20 is journalled in suitable bearings 21 secured to the bottom of the middle crossbars 22 of the main frames 1 and 2. The main shaft 20 is adapted to be connected to receive a drive from any suitable source of power.

Mounted on the shaft 20 is a control clutch 23 having a grooved collar 24 adapted to receive a shifting fork (not shown) to permit the clutch to be thrown into engagement with a sleeve 25 loosely engaged on the shaft 20 (Figure 6). Fastened upon the sleeve 25 is a gear 26.

The various operations of forming conical cups are focused about a spider or turret wheel 27 provided with an apertured flange or rim 28. The turret wheel 27 is keyed on an upper shaft 29 journalled in bearings 30 and 31 secured upon the main frames 1 and 2, respectively. Supported radially upon the turret wheel flange 28 are six mandrel mechanisms of similar construction and each comprising a flanged spindle 32 projecting through an opening in the turret wheel flange 28 and rigidly clamped thereon by means of a retaining nut 33 threaded onto the inner projecting end of said spindle. Rotatably engaged on the spindle 32 is a mandrel supporting sleeve 34 having a bevel gear 35 secured on the inner end thereof (Figure 12), and a chambered conical mandrel 36 fixed on the outer end thereof. Slidably projecting through the spindle 32 is a gripper control sleeve 37 on the outer end of which a notched gripper control cam 38 is secured. The cam 38 is adapted to be shifted into the path of movement of a trip lug 39 (Figure 14), formed on one of a pair of blank grippers or clamping dogs 40, mounted in recesses 41. The two grippers 40 are secured on the ends of a shaft 42 journalled in a bearing block 43 in which the recesses 41 are provided. The bearing block 43 is fixed in a recess provided in the mandrel 36. Springs 44 are engaged around the shaft 42 and are connected with the grippers 40 to normally hold said grippers in closed or gripping position as illustrated in Figures 13 and 14. Engaged around the inner projecting end of the sleeve 37 is a control spring 45 which seats between the end of the spindle 32 and a bracket arm 46 fixed on the inner end of the sleeve 37. The bracket arm 46 carries a pin 47 which projects into an opening in a lever arm 48 pivoted at one end on a stud 49 formed on the turret wheel 27 (Figure 12). A roller 50 is mounted on the lever arm 48 and tracks on the peripheral surface of a gripper control cam 51 secured on the hub 52 of a bearing sleeve or collar 53 positioned within the shaft bearing 31.

Projecting through the sleeve 37 is an air pipe 54 the outer end of which projects into a main air outlet passage 55 formed axially within the mandrel 36 and having a plurality of auxiliary air passages 56 which open through the exterior surface of the mandrel a short distance from the apex thereof (Figure 12). Secured on the inner projecting end of the air pipe 54 is a sleeve 57 having an air control cam 58 formed thereon. When a mandrel reaches a cup discharge position the air control cam 58 is adapted to move into coacting relation with a roller 59 engaged on an arm 60 connected to an air control valve 61 which is mounted in a valve bracket 62 secured on the hub 52 of the bearing collar 53. The valve bracket 62 is provided with an air passage 63 which communicates with an air pressure supply pipe 64. The air pipe 64 is adapted to be connected with any suitable source of air pressure. It will thus be noted that when the air valve 61 is opened air under pressure will pass through the air pipe 54 and enter the air outlet passages 55 and 56 to escape into the interior of a conical cup formed on the mandrel to blow said cup therefrom.

Slidably mounted on each mandrel sleeve 34 adjacent the inner enlarged end of the mandrel 36, is a cup rim forming or curling plate or disc 65 provided with an annular rounded groove 66 (Figure 12). Pivoted on the hub of the rim shaping disc 65 is a forked spring controlled arm 67 of a bell crank member also having a single arm 68 (Figure 11). The bell crank member 67—68 is pivotally supported on a two-arm bracket 69, fixed on the rim 28 of the turret wheel. A roller 70 is rotatably mounted on the end of the bell crank arm 68 and is adapted to ride over a cup edge forming control cam 71 fixed on the bearing member 31 (Figure 8).

Figure 22:
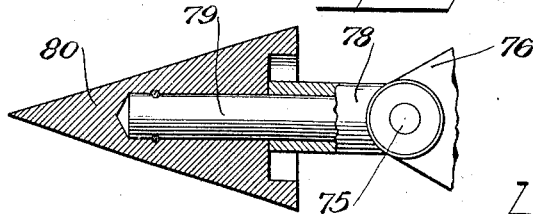
Figure 22 is a longitudinal section of a presser roll taken on line XXII—XXII of Figure 10.

Secured on one side of the main frame 2 below the bearing member 31 is a pressing roll control cam 72 over which a roller 73 is adapted to ride. The roller 73 is mounted on one end of a crank arm 74 secured on one end of a pin shaft 75 journalled in a bracket 76 fixed on the turret wheel rim 28 (Figure 10). Keyed or otherwise secured on the pin shaft 75 is a shank 78 of a spindle 79 having a conical cup presser roll 80 rotatably mounted thereon (Figure 22), for pressing coaction with its respective mandrel 36. A coiled spring 81 connects the crank arm 74 with the turret wheel rim 28 to resiliently hold the presser roll 80 in pressing contact with the cup forming mandrel 36.

The forming mandrels 36 are adapted to be rotated by means of the bevel gears 35 which are in meshing relation with a large bevel gear wheel 82. The gear wheel 82 is secured to the flange 83 of a sleeve 84 rotatably engaged on the shaft 29 (Figure 12) adjacent the turret wheel 27.

Figure 23:
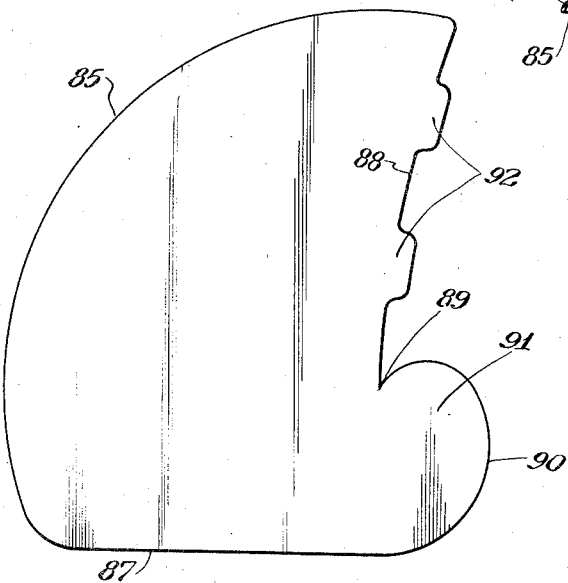
Figure 23 is a developed plan view of a cup blank.

Referring now to Figure 23: The cup blanks used in this type of conical cup making machine are constructed of prepared paper or the like and each blank is of substantially quadrantal form having an arcuate edge 85 which eventually during the cup forming process is rolled outwardly to form a rounded drinking rim or bead 86. The cup blank furthermore, is bounded by a substantially straight edge 87 and a slightly curved edge 88, one end of which connects up with the arcuate edge 85, while the inner end is connected at a point 89 with one end of a curved edge 90 forming an extension or tab 91. The other end of the curved edge 90 merges into the one end of the straight edge 87. The slightly curved edge 88 of the cup blank is provided at spaced intervals with a plurality of integrally extending tabs or lips 92. One surface of the extension 91 and one side of the margin of the blank adjacent the straight edge 87 is adapted to be provided with a layer or patch of cementitious material, the edge of which stops short of the edges 87 and 90 of the cup blank. The shape of the glued section applied to the cup blank is determined by the shape of a glue stamping pad hereinafter more fully described.

The turret wheel 27 is rotated by the shaft 29 on the outer end of which a gear 93 is fixed and receives a drive from a meshing intermediate gear 94 mounted on a stub shaft 95, (Figure 1). The stub shaft 95 is journalled in a bearing bracket 96 fixed on the main frame 1, (Figure 7). Meshing with the intermediate gear 94, is a gear 97 fixed on the outer end of an auxiliary shaft 98 journalled in a bearing 99 on the main frame 1, and in a bearing 100 on the main frame 2. Also fixed on the shaft 98, to the inside of the main frame 1, is a large gear 101 which meshes with an upper large gear 102 keyed on the sleeve 84 to rotate the same and the large bevel gear 82, in a direction opposite to the direction of the turret wheel 27. The large lower gear 101 is in mesh with a driving pinion 103 fixed on a stub shaft 104, journalled in a pair of bearing brackets 105, secured to the inner face of the lower crossbar 4, (Figure 6). Mounted on one end of the stub shaft 104 is an eccentric disc 106 which carries an eccentric pin 107 (Figure 16), on which a connecting rod or link 108 is pivotally engaged. The other end of the link 108 is pivotally connected on an eccentric pin 109 fixed on a second eccentric disc 110, mounted on a shaft 111. The shaft 111 is journalled in bearing brackets 112, also mounted on the inner face of the cross-bar 4. Fixed on the stub shaft 111 is a gear 113 which receives a drive from the gear 26 (Figure 6).

A small bevel gear 114 is mounted on the stub shaft 111 and meshes with a bevel gear 115 fixed on one end of a long power-transfer shaft 116, journalled in bearing brackets 117 secured to the parts of the machine framework. Also fixed on the shaft 116 is an intermediate bevel gear 118, and an end bevel gear 119.

The cup blank feed mechanisms will now be described. A stack of paper cup blanks shaped as illustrated in Figure 23, is adapted to be supported upon a magazine base plate 120 provided with an integral supporting leg 121 formed on the top of a shelf bracket 122 secured on the outer side of the upper portion of the auxiliary frame 9, (Figures 4 and 17). The magazine plate 120 is provided with a pair of normally projecting arms 123. Secured upon the top edge of each magazine arm 123 is a bearing bracket 124. Secured upon the top of the magazine base plate 120 is a pair of cup blank drive posts 125 against which the arcuate edge 85 of the cup blanks is adapted to engage. The straight edges of the cup blanks are adapted to be positioned adjacent a pair of guide posts 126 supported vertically upon a crossbar 127, the ends of which are secured upon the supporting flanges of the bearing brackets 124.

Meshing with the bevel gear 118 (Figure 6), is a bevel gear 128 which is fixed on one end of a shaft 129, journalled in bearings 130, supported on the machine frames 9 and 10. A bevel gear 131 is fixed on the opposite end of the shaft 129 and is in mesh with a bevel gear 132, which is mounted on the lower end of a vertical shaft 133. The shaft 133 is journalled in bearings 134 fastened on the brackets 17 and 18, which are rigidly secured or formed on the outer side of the auxiliary frame 9 (Figure 4). Mounted on the upper end of the shaft 133 is a bevel gear 135 which meshes with a bevel gear fixed on a shaft 136 journalled in the shelf bracket 122. Also journalled on the shaft 136 is a sprocket 137 around which an endless chain 138 is trained. The chain 138 is also trained over a sprocket 139 fixed on one projecting end of a cup blank feed shaft 140. The blank feed shaft 140 is journalled in bearings formed on the magazine arms 123, and has mounted thereon, a cup blank feed roller 141, having a plurality of spaced discs 142 formed thereon. Secured between each pair of discs 142 is a pair of diametrically opposite blocks 143 carrying friction pads 144 on the outer convex surfaces thereof (Figure 17). The friction pads 144 project beyond the peripheries of the discs 142 and are adapted to engage the lowermost cup blank in the magazine at each half revolution of the shaft 140.

Fixed on the projecting end of the blank feed shaft 140, is a gear 145 which meshes with an intermediate gear 146 fixed on a stub shaft 147, journalled in one of the magazine arms 123 (Figure 17). The intermediate gear 146 drives a lower gear 148 keyed on one end of a lower roller shaft 149 which is supported by the magazine arms 123. A lower blank feed roller 150 is mounted on the roller shaft 149. Meshing with the lower feed roller gear 148 is an upper feed roller gear 151 which is fixed on one end of an upper roller shaft 152, journalled in bearing blocks 153, slidably mounted in the brackets 124 beneath control springs 154 (Figure 17). An upper feed roller 155 is mounted on the upper shaft 152 in coacting relation with the lower feed roller 150.

Mounted on the blank feed shaft 140 to the inside of the sprocket 139 is a cam 156 with which a roller 157 coacts. The roller 157 is carried by a curved spring controlled lever or crank arm 158, (Figure 4) which is engaged on one end of a rocker shaft 159 supported in bearing brackets 160, fastened to the angle iron 19. Fixed at spaced intervals on the rocker shaft 159 are a pair of blank pusher arms 161 adapted at predetermined times to push cup blanks discharged from the magazine onto a rotatable blank transfer device.

The cup blank transfer mechanisms are provided for receiving cup blanks from between the magazine feed rollers 150 and 155, and transferring said blanks by intermittent motion first to a glue applying mechanism and then to the cup forming mandrels 36. A mutilated Geneva gear 162 is mounted on the shaft 129 and intermittently drives a Geneva gear 163 (Figures 3 and 4), which is fixed on a shaft 164, journalled in bearings 165 formed on the auxiliary frames 9 and 10. Secured on the shaft 164 is a bevel gear 166 which is in mesh with a bevel gear 167 fixed on the lower end of a hollow vertical shaft 168. The shaft 168 is journalled in bearings 169, secured to the cross-bars 15 and 16, (Figure 3). Mounted on the upper end of the shaft 168 is a hub or spider 170 on which three equidistantly spaced spoke brackets 171 are pivotally mounted. Rigidly secured to each spoke bracket 171 is an open spoke frame 172 to the outer arc-shaped arm of which an angle bracket 173 is rigidly secured. Fastened to the top of each angle bracket 173 and to the top of the curved arm of the frame 172, is a blank supporting plate or table 174 having two edges thereof spaced from two of the arms of the frame 172 to afford a glue applying space over which the margin 87 of a cup blank projects when a blank is fed outwardly by the feed rollers 150 and 155, and is pushed in a centered position upon one of the table plates 174 by the pusher arms 161. Attached to each spoke frame 172 is one end of a coiled spring 175, the other end of which is connected to the wheel hub 170. Pivoted on a pivot pin 176 on each spoke bracket 171 is a control arm 177 having an arcuate slot 178 in one end thereof through which a set screw 179 projects to hold the control arm 177 in a set position of adjustment on the spoke bracket 171. A roller 180 is rotatably mounted on each control arm 177, and has resilient rolling contact with a control cam 181. The cam 181 is fixed on the upper end of a vertical shaft 182 which projects through the hollow shaft 168, and has a small bevel gear 183 secured on the lower end thereof.

The bevel gear 183 is in mesh with a bevel gear 184 secured to one side of a crank arm 185 pivoted on the shaft 164. A roller 186 is carried on the crank arm 185 and coacts with a control cam 187 fixed on the shaft 129, and rotatable therewith. The cams 187 and 181 control the delivery of the tab end of a cup blank to the grippers 40 of a forming mandrel 36. A spring 188 (Figure 6), is connected to the crank arm 185 to return the same and the cam 181 to normal position after a tripping operation of one of the blank carrying spoke arms or tables of the rotatable blank feed wheel.

The blank transfer wheel comprises three sets of blank carrying tables (Figures 1 and 2), which are each adapted to be intermittently moved from a blank receiving position A, into a glue applying position B, and then into a delivery position C. After a cup body blank has been fed onto a table 174 in position A, and partly centered by the pusher arms 161, the Geneva gears 162 and 163 cause the blank transfer wheel to be rotated one-third of a revolution, thereby advancing the centered blank into position B over the glue applying mechanisms which will now be described.

Referring to the detail Figures 19 and 20, a shelf bracket 189 is rigidly secured to the upper end of the outer face of the auxiliary frame 10, and has supported thereon a glue tank or trough 190. Rotatably mounted within the tank 190 is an adhesive supply roller 191 which rotates in the glue within the tank. The roller 191 is supported on a shaft 192, one end of which projects from the tank 190, and has a gear 193 mounted thereon. The gear 193 meshes with a gear 194 mounted on one projecting end of a shaft 195 journalled in bearings 196 on the sides of the tank 190. An adhesive wiping roller 197 is mounted on the shaft 195 and coacts with the feed roller 191 to wipe the excessive glue therefrom. Secured on the second projecting end of the feed roller shaft 192 is a sprocket 198 around which an endless chain 199 is trained. The chain 199 is also trained around a driving sprocket 200 fixed on the outer end of a stub shaft 201 journalled in a bearing 202, forming part of the shelf bracket 189 (Figure 3). A bevel gear 203 is fixed on the inner end of the stub shaft 201 and meshes with a bevel gear 204 mounted upon the end of a vertical shaft 205. The shaft 205 is journalled in an upper bearing 206 secured to the cross-bar 11, and in a lower bearing 207 mounted upon the cross-bar 13. A bevel gear 208 is fixed upon the lower end of the shaft 205 and is in mesh with the bevel gear 119 to receive a drive therefrom.

An adhesive transfer or applying roller 209 is normally positioned to have rolling contact with the adhesive feed roller 191 to be supplied with a coating of adhesive. The roller 209 is supported on a shaft 210, the ends of which are journalled in a pair of blocks 211 slidably mounted on a pair of guide rods 212 supported by the angle bar 19 and by a plate 213 secured to the back of the glue tank 190 (Figure 20). Pivoted on each slide block 211 is a crank or link 214, the end of which is pivoted to the upper end of a long bell crank arm 215. There are two arms 215 fixed on a rocker shaft 216 journalled in a bearing 217, secured to the cross-bar 12 (Figure 3). Also fixed on the rocker shaft 216 is a short bell crank arm 218 carrying a pin 219 which projects through a slot 220 provided in one end of a connecting rod or bar 221 (Figure 4). Connected to the pin 219 is one end of a coiled control spring 222, the other end of which is connected to a pin 223 secured in the side of the connecting bar 221. The lower end of the bar 221 is pivoted to a crank arm 224 fixed on the outer end of a stub shaft 225, journalled in a bearing 226, fastened to the cross-bar 13. Secured on the inner end of the shaft 225 is a bevel gear 227 (Figure 6), which receives a drive from a small bevel gear 228 on the shaft 129.

The above described mechanisms act to reciprocate the adhesive applying roller 209 over a triangular-shaped adhesive applying pad 229 (Figure 19). The glue pad 229 is formed upon the top of an adhesive stamping plate 230 which is mounted upon the upper end of a vertically slidable plate 231. The plate 231 is slidably mounted behind spaced guide rails or bars secured upon one face of an upright guide plate 232, supported on the cross bar 11. Pivoted to the lower end of the slide plate 231, is the upper end of a toggle bar 233 (Figure 4), the lower end of which is pivoted to one end of a lever 234 to be operated thereby. The lever 234 is pivoted at one end on a stud 235 projecting from the crossbar 13. Mounted on one side of the lever 234 is a roller 236 which tracks on the periphery of a glue stamping control cam 237 fixed on the shaft 225.

After a cup body blank has been stamped to apply a patch of glue to the under surface thereof, said adhesived blank is advanced by the transfer wheel from position B into position C, ready to be delivered to the grippers of a forming mandrel 36.

As an adhesived cup blank is being formed into a conical cup on a mandrel, the turret wheel continues to rotate, thereby carrying the cup through different stages or positions, permitting the respective presser roll 80 to continuously iron or press the formed cup on its mandrel until the respective cup carrying mandrel reaches a predetermined position wherein the gripper release and the air blow-off mechanisms for the cup are brought into operation.

*The operation is as follows*

A somewhat detailed description of the operation of the respective mechanisms comprising the rotary type conical cup forming machine has already been given in connection with the detailed description of the various auxiliary mechanisms so that it will only be necessary to give a brief résumé of the operation of the machine embracing the embodiment illustrated and described.

The machine is started by shifting the starting clutch 23 so that a drive from the main driving shaft 20 is transmitted to the sleeve 25 (Figure 6) to cause rotation of the gears 26 and 113.

The cup blanks are supported on the magazine base plate 120 between the guide posts 125 and 126, with the lowermost blank positioned over the discharge roller 141 which is rotated by the chain 138 (Figure 4). With the rotation of the roller 141 the pads 144 thereon are brought into frictional contact with the lowermost blank causing said blank to be discharged from the magazine and advanced between the feed rollers 150 and 155, operated by the gears 145, 146, 148 and 151 (Figures 17 and 18). The rollers 150 and 155 advance the blank over the pusher arms 161 and onto one of the table plates 174 of the blank transfer wheel.

At this stage of the operation the cam 156 (Figure 4), coacting with the roller 157, rocks the crank arm 158 and the shaft 159, thereby causing the two pusher arms 161 to engage against the arcuate edge 85 of the blank and push said blank into a centered position upon the table plate 174 when the same is in station A (Figure 2).

In the advanced centered position of a blank upon one of the table plates of the transfer wheel, the margins 87 and 90 of the blank project beyond the edges of the table plate into the glue applying space in the path of operation of the adhesive stamping pad 229.

After a body blank has been positioned upon a table plate 174, the Geneva gear 162 on the shaft 129, coacts with the Geneva gear 163 to rotate the bevel gears 166 and 167, and the hollow shaft 168, thereby causing the transfer wheel to be rotated through a third of a revolution to carry the centered blank from station A into station B, over the glue applying mechanisms.

The glue applying mechanisms are operated by the chain 199, causing the large feed roller 191 to carry glue upwardly with the wiping roller 197 acting to remove surplus glue from said supply roller. The adhesive applying roller 209 is normally held in resilient rolling contact with the supply roller 191 by the spring 222 and the action of the crank arm 224 and the connecting rod 221. A coating of glue is thus received by the glue applying roller 209 from the supply roller 191. The crank arm 224 at this time in the operation actuates the connecting rod 221 and the bell crank arm 218, to rock the shaft 216, thereby causing the long bell crank arms 215 to advance the roller 209 through a horizontal path controlled by the guide rods 212. The roller 209 is thus caused to roll over the stamping pad 229 to coat the same with a layer of glue, while the stamping plate 230 is in the full line position of Figure 20.

The control cam 237 at this stage in the operation acting on the roller 236 (Figures 4 and 6), swings the lever 234 upwardly, thereby raising the toggle bar 233, which in turn slides the plate 213 upwardly in its guides, and thereby raises the stamping plate 230 into the dotted line position of Figure 20. The stamping pad 229 is thus elevated and stamps the under surface of the projecting margins 87 and 90 of the cup blank with a triangular patch of glue.

After a cup blank has been stamped with a patch of glue, the Geneva gears 162 and 163 again act to cause rotation of the hollow shaft 168 and the transfer wheel through a third of a revolution, thereby carrying the glued cup blank from station B into station C.

The glued blank is now ready to be delivered to a forming mandrel 36. The control cam 187 on the shaft 129 now acts on the roller 186 and the arm 185, causing rotation of the shaft 182 and the control cam 181. The cam 181 acting on the roller 180 causes the roller arm 177 and the spoke bracket 171 in station C, to be pivoted about the pin 176, thereby swinging the blank carrying table plate 174 toward the mandrel 36 so that the tabs 92 of the cup blank are projected into the recesses 41 of the mandrel.

Referring to Figure 15, it will be noted that when the tabs of the blank are projected into the mandrel recesses 41, that the grippers 40 are moved into open position by the control cam 38, which is governed by the action of the gripper control cam 51. As soon as the tabs 92 of a blank have been projected into the mandrel recesses 41, the spring 45 acts to retract the cam 38, permitting the gripper control springs 44, (Figure 12), to act automatically to close the grippers and clamp the tabs within the recesses of the mandrel. As soon as a blank has been gripped by the mandrel grippers 40, the spring 175 returns the table plate 174 into its normal radial position.

The turret wheel 27 is rotated with a variable speed controlled by the eccentric discs 106 and 110, thereby causing the gripped blank to be drawn off of the table plate 174. With the advance of the turret wheel the mandrel 36, as it advances from station to station, is rotated by the bevel gear 35 coacting with the large bevel gear 82. The gripped blank is thus wound around the mandrel, and the pressing roller 80 controlled by its spring 81, acts to press the glued margins of the blank over the plain or unglued margin 88 of the blank, thereby forming the conical body of the cup. The edge 85 of the cup projects beyond the enlarged end of the mandrel, and the tabs 92 are positioned to the inside of the cup body still engaged by the grippers 40.

Figure 24:
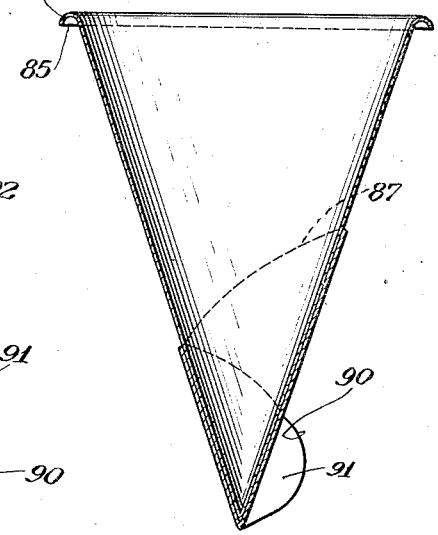
Figure 24 is a vertical central section of the completed cup.

The continued rotation of the turret wheel carries the ironed or pressed cup toward station D (Figure 8), bringing the roller 70 into engagement with the stationary rim-forming control cam 71 (Figures 8 and 9). The cam 71 acts to operate the rim 68, thereby causing the forked arm 67 to swing toward the enlarged end of the mandrel 36. The rim-shaping plate or disc 65 is thus moved into engagement with the upper margin 85 of the cup, causing said upper margin to be engaged in the groove 66 to be curled outwardly and downwardly to form a curled rounded rim 86 on the cup as illustrated in Figure 24. The rim-shaping plate 65 is retracted by its control spring when the roller 70 passes off of the cam 71.

This completes the forming of the conical cup which is now carried by the rotating turret wheel from station D toward the cup discharge station E. As the mandrel 36 carrying the finished cup advances toward station E, the roller 73 on the presser roll control arm 74, rides over the stationary control cam 72 (Figure 8), thereby causing the pin 75 to be rocked to swing the presser roller 80 away from the mandrel 36 and the cup carried thereon.

At this stage in the operation, the roller 50 coacting with the cam 51 slides the cam 38 outwardly into coacting relation with the trip lug 39 of the grippers 40, so that in the rotation of the mandrel, the cam 38 causes the grippers 40 to release their hold on the tabs 92 of the formed cup.

When the completed cup reaches station E, the cam 58 coacting with the roller 59, opens the air pressure valve 61, thereby causing a discharge of compressed air from the air supply pipe 64 to flow through the passaged pipe 54 and into the passages 55 and 56 of the mandrel to strike against the interior of the released cup to blow the cup from the mandrel.

It will be noted that the improved rotary conical cup machine of this invention is adapted to manufacture conical paper cups out of cup blanks, and that the blanks are supplied with patches of adhesive before being delivered to the forming mandrels. The blanks are successively carried through the various stations permitting different functions to be performed in the completion of a cup. A plurality of cups are simultaneously under process of construction and a completed cup is discharged at each sixth of a revolution of the turret wheel.

I am aware that many changes may be made, and that numerous details of construction may be varied through a wide range without departing from the principles of this invention, and I, therefore, do not purpose limiting the patent granted hereon, otherwise than necessitated by the prior art.

I claim as my invention:

1. A cup forming machine comprising in combination a rotatable turret wheel, a plurality of mandrels radially mounted thereon, means for simultaneously rotating said mandrels and said turret wheel, a rotatable blank transfer wheel, a cup blank magazine, feed means for feeding cup blanks from said magazine to said transfer wheel, a gluing device for applying glue to cup blanks carried by said transfer wheel to said turret wheel, grippers in said mandrels adapted to grip the glued cup blanks fed thereto by the transfer wheel, slidably and rotatably mounted cam means in said mandrels for releasing the grippers after the completion of the cups, and air pressure means for blowing the cups off of said mandrels.

2. A cup forming machine comprising in combination a rotatable turret wheel, a plurality of mandrels rotatably mounted thereon, grippers in said mandrels, means for rotating said turret wheel and said mandrels, a rotatable blank transfer wheel, a cup blank magazine, feed means for feeding cup blanks from said magazine to said transfer wheel, a gluing device for applying patches of glue to the cup blanks carried by said transfer wheel, cam controlled means forming a part of said transfer wheel for delivering cup blanks to said mandrels to be gripped by said grippers, cam controlled rotatable pressers carried by the turret wheel and coacting with the mandrels to roll the glue blanks around said mandrels to form cups, cam operated means for curling the upper margins of the formed cups, cam controlled means for releasing the grippers, and cam operated mechanisms connected with the mandrels for blowing the cups from the mandrels.

3. A cup forming machine comprising in combination a rotatable turret wheel, means for driving the same, mandrels rotatably mounted on said turret wheel, grippers in said mandrels, cam controlled means for operating said grippers, an intermittently rotatable transfer wheel for cutting across the path of rotation of the turret wheel for delivering blanks to said mandrels to be engaged by said grippers, and presser rolls carried by the turret wheel coacting with said mandrels to form the blanks around the mandrels and press said blanks to form cups.

4. A cup forming machine comprising a turret wheel, means for driving the same, passaged mandrels rotatably mounted on said turret wheel and operable by said driving means, grippers in said mandrels, a rotatable blank transfer wheel, means for intermittently rotating the same through the path of rotation of said turret wheel, cam controlled tables forming part of said transfer wheel adapted to be rocked at predetermined times to deliver blanks to said mandrels, cam operated mechanisms in said mandrels for actuating said grippers to cause the same to grip the blanks delivered to said mandrels, rotatable presser rolls carried by the turret wheel and adapted to coact with said mandrels during the translation thereof to cause the blanks to be wound around said mandrels to form conical cups, air control cams carried by the mandrels, and an air valve positioned in the path of travel of said air control cams to be operated thereby to cause the completed cups to be blown off of said mandrels.

5. A cup making machine comprising a rotatable turret wheel, a rotatable blank transfer wheel positioned to cut across the plane of rotation of said turret wheel, driving means for operating said wheels, passaged rotatable mandrels carried by said turret wheel, pressing rollers carried by said turret wheel and coacting with said mandrels, grippers in said mandrels, means for operating the grippers, radially extending blank carrying tables forming a part of said transfer wheel, feed means for feeding blanks on said tables, cam mechanisms for rocking said tables at predetermined times to deliver blanks to said mandrels to be gripped by said grippers, gear means operated by said driving means for rotating the mandrels to cause the gripped blanks to be curled around the mandrels to form cups, cam controlled means for curling the rims of said cups, air supply means and control members connected with the mandrels adapted to be brought into coacting relation with said air supply means during the rotation of the turret wheel to cause the cups to be blown from the mandrels.

6. A cup making machine comprising a turret wheel, a blank transfer wheel, means for continuously rotating the turret wheel, mechanisms for intermittently rotating said transfer wheel, rotatable conical mandrels carried by said turret wheel, a rotatable spider, blank transfer tables pivotally supported thereon, a blank feed device for delivering blanks onto said tables, cam controlled means on said spider for individually causing said tables to deliver a body blank to a mandrel when in rotating position, cam controlled gripper means in each of the mandrels for automatically gripping a blank, gear means for rotating the mandrels to cause the blanks to be wound around the mandrels to form conical cups, and cam controlled ejecting mechanisms positioned to permit the mandrels to successively be brought into registered coacting relation therewith to cause discharge of the conical cup from said mandrels.

7. A cup making machine comprising a vertically rotatable turret wheel, conical mandrels rotatably mounted thereon, a rotatable transfer wheel for delivering glued blanks to said mandrels, grippers in said mandrels for gripping the blanks delivered thereto, means for rotating the turret wheel and said mandrels to form the glued blanks around the mandrels to form conical cups, rotatable means carried by said turret wheel and coacting with the mandrels to thoroughly iron the conical cups during the translation of said mandrels, cams connected with said mandrels, and stationary pneumatic means adapted to be operated by said cams at predetermined times to cause the ironed conical cups to be blown from said mandrels.

8. A cup making machine comprising a rotatable turret wheel, mechanisms for delivering cup blanks to said turret wheel, presser members and mandrels rotatably supported on said turret wheel for receiving said blanks and forming the same around said mandrels to form cups, cams mounted to travel with said mandrels, and means controlled by the movement of said cams for discharging the cups from said mandrels when the same reach a predetermined position in the rotation of the turret wheel.

9. A cup making machine comprising a rotatable turret wheel, intermittently rotatable rocker mechanisms for delivering cup blanks thereto, forming mechanisms carried on the periphery of said turret wheel for receiving said blanks to form the same into cups, a stationary air supply mechanism, and a plurality of cams carried by the turret wheel adapted to be consecutively brought into engagement with said stationary air supply mechanism to actuate the same to cause the cups to be automatically blown from said forming mechanisms.

10. A cup forming machine comprising a turret wheel, a blank magazine, means for removing blanks from the magazine, a gluing device, a transfer device for first delivering the blanks to the gluing device and then delivering the glued blanks to said turret wheel, pairs of coacting members carried by the turret wheel adapted to receive the blanks and form the same into cups, a stationary discharge mechanism, and means carried by the turret wheel to actuate said stationary discharge mechanism to cause the conical cups to be removed from said turret wheel.

11. A cup making machine comprising a continuously rotatable turret wheel, rotatable members thereon, an intermittently rotatable feed wheel adapted to deliver blanks to the mandrels and then cut across the path of said mandrels, cam controlled means pivotally mounted on said turret wheel for coaction with said mandrels to cause the blanks to be formed into cups on said mandrels, cam operated means carried by the mandrels for curling the drinking edges of said cups, and means actuated by the mandrels to cause the cups to be individually removed from said mandrels when the same are advanced into a discharge position.

12. A cup forming machine comprising a rotatable turret wheel, a mandrel thereon, means for rotating and translating the same, mechanisms for feeding a blank to said mandrel, grippers in said mandrel for engaging the blank, a presser carried by the turret wheel in position to coact with said mandrel to cause the blank to be formed into a cup on said mandrel and be continuously pressed during the period of translation of said mandrel, a stationary valve mechanism, means for supplying compressed air thereto, and a cam carried by said mandrel adapted to be brought into coacting relation with said valve to actuate the valve when the same is in register with the mandrel to cause the pressed cup to be automatically discharged from the mandrel.

13. In a cup making machine the combination with a chambered mandrel, a blank feed device, mechanisms for operating the same, Geneva gear controlled means for feeding a blank to the side of said mandrel, spring controlled grippers in said mandrel for gripping the blank to permit the blank to be formed into a cup around said mandrel, cam controlled means for releasing the grippers after a cup has been formed, a cam member adapted to travel with said mandrel, and means adapted to be actuated by said cam member when the same reaches a predetermined position of translation to cause the cup to be automatically removed from said mandrel.

14. In a cup making machine of the class described the combination with a rotatable turret wheel, means for continuously rotating the same at a variable speed, a plurality of conical-shaped mandrels rotatably supported thereon and provided with recesses, spring controlled pressers associated with said mandrels and movable therewith through different stations of translation of the mandrels, and a stationary cam for releasing the pressers at predetermined times to permit the cups to be discharged from the mandrels.

15. In a cup making machine the combination with a continuously rotatable variable speed turret wheel, of a recessed mandrel rotatably mounted thereon, gear means for rotating said mandrel, intermittently rotatable means for delivering a blank to the mandrel, grippers carried within the mandrel for engaging the blank, a presser carried by the turret wheel for coaction with said mandrel to cause the blank to be formed into a cup, a stationary cam for releasing said presser, a rim forming device adjacent the enlarged end of said mandrel, and stationary cam means for operating the same to cause the rim of the cup on said mandrel to be curled.

16. In a cup making machine of the class described the combination with a rotatable turret wheel, means for rotating the same at variable speed, a recessed mandrel carried axially on said turret wheel, grippers in said mandrel adapted to grip a blank fed thereto, a slidably and rotatably mounted cam in said mandrel for actuating the grippers, a cam controlled pivoted roller carried on said turret wheel for coaction with the mandrel to form the blank into a cup on said mandrel and continuously press the cup during the translation of the mandrel, and a grooved rim-forming means slidably mounted adjacent one end of the mandrel.

17. In a cup making machine of the class described the combination with a rotatable turret wheel, of a rotatable mandrel mounted thereon, means for feeding a blank to the mandrel, a gripper in said mandrel, a slidably and rotatably mounted cam in said mandrel for operating the grippers, a presser roller pivotally supported on said turret wheel for coaction with said mandrel to cause the blank to be wound around said mandrel to form a cup, a rim-forming device associated with said mandrel, a stationary cam for actuating said rim-forming device to cause the rim of the cup to be curled, a stationary cam for moving the presser roller away from said mandrel, and means for discharging the finished cup from the mandrel when said presser roller is released.

18. In a cup making machine of the class described the combination with a turret wheel, of a sleeve rotatably supported thereon, a chambered mandrel secured to said sleeve, means for feeding a cup blank to the mandrel, grippers pivoted in said mandrel for gripping the blank, gear means for rotating said sleeve and the mandrel to cause the blank to be wound around the mandrel to form a cup, a rim-forming mechanism slidably supported on said sleeve, a cam for actuating said rim-forming mechanism to cause the rim of the cup to be curled, and a cam rotatably and slidably mounted in said mandrel for releasing the grippers.

19. In a machine of the class described the combination with a turret wheel, of a mandrel rotatably supported thereon, grippers in said mandrel, a cam slidably and rotatably mounted in said mandrel for actuating said grippers, and cam controlled means carried by the turret wheel for moving the gripper control cam into an out of coacting engagement with said grippers.

20. In a cup making machine of the class described the combination with a rotatable turret wheel, of a sleeve rotatably mounted thereon, gear means for rotating the sleeve, a chambered mandrel secured on the outer end of said sleeve, grippers in said mandrel, a gripper control cam in said mandrel, spring means for holding the gripper control cam out of coacting engagement with said grippers, and cam operated means for sliding the gripper control cam into coacting engagement with the grippers to cause release of the same.

21. In a cup machine of the class described the combination with a rotatable turret wheel, of a sleeve rotatably supported thereon, a gear on said sleeve, means for rotating said gear and said sleeve, a chambered mandrel secured on said sleeve, cam controlled grippers in said mandrel for engaging a blank fed thereto, a cam controlled presser on said turret wheel having the outer surface in rolling contact with said mandrel to cause the gripped blank to be formed around said mandrel into a cup, and a cam actuated rim former slidably engaged upon said sleeve between said gear and said mandrel adapted at a predetermined time in the translation of the mandrel to be moved into engagement with the rim of the cup to curl said rim.

22. In a cup forming machine of the class described the combination with a turret wheel and a gear wheel, means for rotating the same in opposite directions, sleeves rotatably supported radially on said turret wheel, gears on said sleeves adapted to be driven by said gear wheel, mandrels secured on said sleeves to be rotated thereby, cam operated grippers carried by said mandrels to permit blanks to be gripped and formed around said mandrels to form cups, and cam controlled formers slidably mounted on said sleeves adapted to be moved into engagement with the rims of said cups at predetermined times in the rotation of said turret wheel to cause the rims of the cups on said mandrels to be curled.

23. In a cup forming machine of the class described the combination with a turret wheel, of a gear wheel mounted adjacent thereto, means for rotating said turret wheel and said gear wheel in opposite directions, sleeves rotatably supported on said turret wheel, gears carried by said sleeves in mesh with said gear wheel to receive a drive therefrom, mandrels carried by said sleeves, cam actuated grippers in said mandrels for gripping blanks fed thereto to be formed into cups, rim-forming means carried on said sleeves adapted to be actuated at predetermined times in the rotation of said wheel to cause the rims of the formed cups to be curled, cup discharge control means connected with said mandrels, and a discharge mechanism adapted to be set into operation by said cup discharge control means at predetermined times during the translation of said mandrels to cause the completed cups to be automatically discharged from said mandrels.

24. In a machine of the class described the combination with a turret wheel, of a sleeve rotatably supported radially thereon, means for rotating said sleeve, a chambered mandrel on said sleeve, spring controlled grippers in said mandrel, a cam slidably mounted in said mandrel, and means for sliding and rocking said cam into engagement with the grippers to release the same.

25. In a machine of the class described the combination with a rotatable turret wheel, of a sleeve rotatably mounted thereon, a chambered mandrel on said sleeve, spring controlled grippers on said mandrel adapted to grip a blank fed thereto to permit the blank to be wound around said mandrel to form a cup, a cam slidably mounted in said mandrel, means for moving said cam into a position to cause release of said grippers after a cup has been formed on said mandrel, a cup discharge mechanism, and cam means carried by the turret wheel adapted to be moved into registration with said discharge mechanism to cause the same to discharge the cup from the mandrel when said grippers are released.

26. In a machine of the class described the combination with a turret wheel, of a sleeve rotatably supported thereon, a chambered mandrel on said sleeve, spring controlled grippers in said mandrel adapted to engage a blank fed thereto to permit the blank to be formed into a cup, a cam controlled cam in said mandrel adapted to cause release of the grippers when a cup is formed, and pneumatic means connected with the mandrel for blowing the released cup therefrom.

27. In a cup forming machine the combination with a rotatable turret wheel, of mandrels rotatably mounted thereon, means for continuously rotating the turret wheel at variable speeds, pressers pivotally mounted on said turret wheel for coaction with said mandrels, a rotatable feed wheel, and means for operating the same intermittently to cause blanks to be delivered to said mandrels.

28. In a cup forming machine of the class described the combination with a rotatable turret wheel, of pairs of coacting mandrels and pressers rotatably mounted thereon, means for continuously rotating said turret wheel at variable speeds, a feed wheel mounted to cut across the plane of rotation of said turret wheel, and means for intermittently operating said feed wheel to cause cup blanks thereon to be fed to said mandrels.

29. In a cup forming machine of the class described the combination with a rotatable turret wheel of pairs of mandrels and pressers rotatably supported on said turret wheel, means for rotating said mandrels, mechanisms for continuously rotating said turret wheel at variable speeds, a blank feed wheel, and means for intermittently rotating said feed wheel across the plane of rotation of said turret wheel to deliver blanks to said mandrels.

30. In a cup forming machine of the class described the combination with a rotatable forming wheel of means for continuously rotating the same at variable speeds, a blank feed wheel, and means for intermittently rotating said feed wheel to feed blanks to said forming wheel.

31. In a cup forming machine of the class described the combination with a turret wheel of means for continuously rotating the same at variable speeds, cup forming mechanisms carried by said turret wheel, a blank feed wheel, means for intermittently rotating the same to feed blanks to said cup forming mechanisms to be formed into cups, and a stationary cup discharge mechanism positioned to permit the cup forming mechanisms to be successively brought into register therewith to actuate the same to cause cups to be discharged.

32. In a cup forming machine of the class described the combination with a variable speed continuously rotatable cup forming turret wheel of an intermittently rotatable cup blank feed wheel adapted to feed blanks thereto to be formed into cups, and a cup discharge mechanism adapted to be operated periodically by said cup forming turret wheel to cause completed cups to be discharged therefrom.

33. In a machine of the class described the combination with a cup forming turret wheel, of means for continuously rotating the same at variable speeds, a blank feed wheel, means for intermittently rotating the same across the field of rotation of said turret wheel, a stationary pneumatic cup discharge mechanism, and means carried by the cup forming turret wheel adapted to periodically actuate said pneumatic cup discharge mechanism to cause completed cups to be blown from said turret wheel.

34. In a cup forming machine of the class described the combination with a rotatable cup forming mechanism, of a blank feed mechanism, cam controlled tables pivotally mounted thereon and rotatable therewith, means for rotating said blank feed mechanism intermittently, and cam means for actuating said tables when the same reach a predetermined position to cause the same to pivot and feed a blank to said cup forming mechanism.

35. In a cup forming machine of the class described the combination with a cup forming mechanism, of a blank feed device, a blank transfer mechanism, spring controlled tables pivotally mounted on said transfer mechanism, means for intermittently rotating said transfer mechanism, and a cam positioned to cause said tables to be successively pivoted when reaching a predetermined position of translation to cause blanks on said tables to be delivered to said cup forming mechanism.

36. In a machine of the class described the combination with a cup forming mechanism, of a blank feed device, a transfer mechanism, means for rotating the same intermittently, spring controlled tables pivotally mounted on said transfer mechanism adapted to receive blanks from said feed device, roller arms mounted on said tables and a stationary cam coacting with said roller arms adapted at predetermined times to pivot said tables to cause blanks thereon to be delivered to said cup forming mechanism.

37. In a machine of the class described the combination with a cup forming mechanism, of a blank feed magazine, a rotatable spider, means for intermittently rotating the same, blank carrying tables pivotally mounted on said spider, springs connecting said tables with said spider, arms adjustably mounted on said tables, a stationary cam and rollers on said arms coacting with said stationary cam to cause the blank carrying tables to be pivoted at predetermined times in the rotation of said spider to cause blanks to be delivered to said cup forming mechanism.

38. In a cup forming machine of the class described the combination with a blank feed magazine, of a gluing mechanism, a continuously rotatable cup forming mechanism, a rotatable blank transfer device, a feed mechanism for delivering blanks from the magazine to said transfer device, and means for intermittently rotating the blank transfer device whereby blanks are received from the magazine and delivered to said gluing mechanism and then advanced to be delivered to said cup forming mechanism.

39. In a machine of the class described the combination with a blank feed magazine, of a blank gluing mechanism, a cup forming mechanism, a rotatable spider, means for intermittently rotating the same, spring controlled tables pivotally supported on said spider to permit blanks received from said magazine to be intermittently delivered to said gluing mechanism to be glued, and cam controlled means on said tables adapted to cause the tables to be pivoted at predetermined times in the rotation of said spider to cause the glued blanks to be delivered to said cup forming mechanism.

40. A cup forming machine comprising in combination a rotatable turret wheel, a plurality of mandrels mounted thereon, means for rotating said mandrels and said turret wheel, a rotatable blank transfer wheel, a cup blank magazine, feed means for feeding cup blanks from said magazine to said transfer wheel, a gluing device for applying glue to cup blanks carried by said transfer wheel to said turret wheel, gripper means in said mandrels adapted to grip the glued cup blanks fed thereto by the transfer wheel, control means in said mandrels for releasing the grippers at predetermined times to release the formed cups on said mandrels, and means operated in timed relation with the rotation of the turret wheel for discharging the released cups off of the mandrels.

41. A cup forming machine comprising in combination a rotatable turret wheel, a plurality of mandrels rotatably mounted thereon, grippers in said mandrels, means for rotating said turret wheel and said mandrels, a rotatable blank transfer wheel, a cup blank magazine, feed means for feeding cup blanks from said magazine to said transfer wheel, a gluing device for applying glue to the cup blanks carried by said transfer wheel, means forming part of said transfer wheel for delivering cup blanks to said mandrels to be gripped by said grippers, presser means co-acting with the mandrels to roll the glued blanks around said mandrels to form cups, means movable relative to the mandrels for curling the upper margins of the formed cups means for releasing the grippers at predetermined times to release the formed cups and means co-acting with the mandrels at predetermined positions in the translation thereof to discharge the released cups from the mandrels.

42. A cup of forming machine, comprising in combination a rotatable turret wheel, means for driving the same, mandrels rotatably mounted on said turret wheel, grippers in said mandrels, means for controlling the operation of said grippers, an intermittently rotatable transfer wheel for cutting across the plane of rotation of the turret wheel for delivering blanks to said mandrels to be engaged by said grippers, and presser means co-acting with said mandrels to form the blanks around the mandrels and press said blanks to form cups.

43. A cup making machine comprising a rotatable turret wheel, mandrels rotatably mounted thereon, a rotatable transfer wheel for delivering glued blanks to said mandrels, grippers in said mandrels for gripping the blanks delivered thereto, means for rotating the turret wheel and said mandrels to form the glued blanks around the mandrels to form cups, presser means co-acting with the mandrels during the translation thereof to thoroughly press the cups, and means operated from the machine when a mandrel is brought into register therewith to cause the formed cup to be discharged from said mandrel.

44. A cup forming machine comprising a turret wheel, means for continuously rotating the same at a variable speed, a blank magazine, means for removing blanks from the magazine, a gluing device, an intermittently rotatable transfer device for first delivering the blanks to the gluing device and then delivering the glued blanks to said turret wheel, members carried by the turret wheel for receiving the glued blanks and forming the same into cups, pressure means co-acting with said members to assist in the forming of the cups, a stationary discharge mechanism, and means operated from the machine in timed relation with the rotation of the turret wheel to operate the stationary discharge mechanism when said members are brought into register therewith to cause discharge of the cups from said members.

45. A cup making machine comprising a continuously rotatable variable speed turret wheel, rotatable members thereon, an intermittently rotatable feed wheel for delivering blanks to said members and cutting across the plane of travel of said members, presser means co-acting with said members to form the blanks into cups, means shiftable with respect to said members for curling the drinking edges of said cups, and means operable when said members are brought into register therewith to cause discharge of the cups from said members.

46. A cup forming machine comprising in combination a rotatable turret wheel, a mandrel thereon, means for rotating and translating the same, mechanism for feeding a blank to said mandrel, gripping means in said mandrel for engaging the blank, a presser positioned to co-act with said mandrel to cause the blank to be formed into a cup during the period of translation of said mandrel, a valve mechanism, means for supplying compressed air thereto, and means for operating the valve mechanism when the mandrel is brought into register therewith to cause the cup to be discharged from the mandrel.

47. In a cup forming machine the combination with a rotatable turret wheel, of mandrels rotatably mounted thereon, means for continuously rotating the turret wheel at variable speeds, presser means positioned for co-action with said mandrels during the translation thereof, a rotatable feed wheel, and means for intermittently rotating the same to cause the blanks to be delivered to said mandrels.

48. In a cup forming machine of the class described the combination with a rotatable turret wheel, of mandrels rotatably mounted thereon, means for continuously rotating the turret wheel at variable speeds, presser means co-acting with the mandrels during the translation thereof, a feed wheel mounted to cut across the plane of rotation of said turret wheel, and means for intermittently operating said feed wheel to cause blanks to be continuously fed to said mandrels.

49. In a cup forming machine of the class described in combination with a variable speed continuously rotatable cup forming turret wheel, of an intermittently rotatable cup blank feed wheel adapted to feed blanks thereto to be formed into cups, means carried by the turret wheel for forming curled rims on the cups, and a cup discharge mechanism operable periodically from the machine to discharge the completed cups from the turret wheel.

50. In a cup forming machine the combination with a continuously rotatable variable speed cup forming mechanism, of intermittently rotatable blank feed mechanism positioned to cut across the plane of rotation of the cup forming mechanism to deliver blanks thereto to be formed into cups, and reciprocating means operated in timed relation with the cup forming mechanism to form curled rims on the cups.

51. In a cup forming machine of the class described, the combination with a variable speed continuously rotatable cup forming means, of an intermittently rotatable cup blank feed means for feeding blanks thereto to be formed into cups, and a glue applying means movable toward and from said blank feed means to apply glue to the blanks carried thereon.

52. In a cup forming machine, the combination with a cup forming means and a cup blank feed means, said means mounted to intersect the plane of rotation of one another, and glue applying means movable toward and from the cup blank feed means to apply glue to the blanks carried thereon.

CESARE BARBIERI.